US007068923B2

(12) United States Patent
Miyazaki (10) Patent No.: US 7,068,923 B2
(45) Date of Patent: Jun. 27, 2006

(54) SPEED CONTROL APPARATUS OF MOTOR

(75) Inventor: Tomohiro Miyazaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/510,754

(22) PCT Filed: Nov. 26, 2002

(86) PCT No.: PCT/JP02/12282

§ 371 (c)(1),
(2), (4) Date: Oct. 12, 2004

(87) PCT Pub. No.: WO2004/049550

PCT Pub. Date: Jun. 10, 2004

(65) Prior Publication Data

US 2005/0238335 A1    Oct. 27, 2005

(51) Int. Cl.
*H02P 5/06* (2006.01)
(52) U.S. Cl. ............... 388/806; 388/815; 388/823; 318/629; 318/632; 318/432
(58) Field of Classification Search ........ 318/798–802, 318/767, 611, 623, 432, 720, 721, 632, 629; 388/800, 806, 815, 823
See application file for complete search history.

(56) References Cited

U.S. PATENT DOCUMENTS

| 5,304,905 | A | * | 4/1994 | Iwasaki | ............... 318/561 |
| 5,404,418 | A | * | 4/1995 | Nagano | ............... 388/806 |
| 5,541,488 | A | * | 7/1996 | Bansal et al. | ............... 318/801 |
| 5,903,129 | A | * | 5/1999 | Okuno et al. | ............... 318/721 |
| 6,219,196 | B1 | | 4/2001 | Semba et al. | |
| 6,274,994 | B1 | * | 8/2001 | Tsutsui | ............... 318/560 |
| 6,703,809 | B1 | * | 3/2004 | Royak et al. | ............... 318/727 |

(Continued)

FOREIGN PATENT DOCUMENTS

JP        60-039397 A    3/1985

(Continued)

OTHER PUBLICATIONS

"Steady-State Analysis of Adaptive IIR Digital Notch Filter" written by Lijie Han, Haiyun Jiang and Shotaro Nishimura published in Sep. 1998.

*Primary Examiner*—Rina Duda
(74) *Attorney, Agent, or Firm*—Sughrue Mion, PLLC (57) ABSTRACT

A speed control apparatus includes a speed control part 12 for generating a source current command based on a difference between a speed command of a motor 4 and speed detection in which a speed of the motor 4 for driving a load 2 is detected, a notch filter 14 which can break a notch frequency resulting in a predetermined frequency selected among continuous frequency band widths and also generates a compensating current command in which the notch frequency is eliminated from the source current command signal, a notch filter adaptive part 16 for selecting the notch frequency so that the compensating current command in which a sustained vibration frequency component of the source current command is eliminated is generated from the notch filter 14, a subtracter 103 for generating an elimination portion current command resulting in a difference between the source current command and the compensating current command, and an adder 109 for adding the compensating current command and the elimination portion current command and generating a current command passed through the motor 4.

4 Claims, 10 Drawing Sheets

U.S. PATENT DOCUMENTS 6,844,697 B1 * 1/2005 Masaki et al. .............. 318/721

FOREIGN PATENT DOCUMENTS

| JP | 6-78575 A | 3/1994 |
| JP | 11-18465 A | 1/1999 |
| JP | 11-96704 A | 4/1999 |
| JP | 11-123000 A | 4/1999 |
| JP | 2001-251880 A | 9/2001 |
| WO | WO 00/70739 A1 | 11/2000 |

* cited by examiner

PRIOR ART
FIG. 1

PRIOR ART

PRIOR ART

SPEED CONTROL APPARATUS OF MOTOR

TECHNICAL FIELD

The present invention relates to a speed control apparatus of a motor capable of properly setting a notch frequency of a notch filter.

BACKGROUND ART

A speed control apparatus of a motor rotates a motor and a load at a commanded speed given from a host controller by generating torque for accelerating or decelerating a speed of the motor according to a speed error.

Generally, as a value of a speed gain Kv multiplied by a speed error resulting in a difference between a speed command signal and a speed detection signal of a motor by speed control unit is set large, a speed of the motor is corrected at large acceleration with respect to the speed error, so that the speed error decreases in a short time and speed control with high accuracy can be performed.

However, when rigidity of a motor shaft for transmitting torque generated from the motor to a load is low, the value of the speed gain Kv cannot be increased and control accuracy becomes worse. That is, when the rigidity of the shaft is low, the shaft acts as a spring, so that mechanical vibration tends to occur. As a result of this, when the speed gain Kv is set large, the mechanical vibration increases with time and a control system may oscillate.

As unit for solving such a problem, a speed control apparatus of a motor in which a notch filter is inserted into a speed loop of the motor is disclosed in a publication of JP-A-60-39397.

According to the publication, a filter for eliminating only a particular frequency component from an input signal and producing an output is inserted into the speed loop and a frequency component of mechanical resonance is eliminated and thereby oscillation of a control system can be suppressed.

According to such a speed control apparatus of the motor, while suppressing the oscillation of the control system, a speed gain Kv can be set large and as a result, control with high accuracy can be achieved.

However, the motor speed control apparatus as described above is constructed so that resonance of a mechanical system does not occur by setting the notch filter so as to match a notch frequency with a known mechanical system resonance frequency. Then, in order to see the mechanical system resonance frequency, there are a method by calculation and a method by measurement, but there were problems that complicated calculation or a dedicated measuring device is required, respectively.

Figure 1:
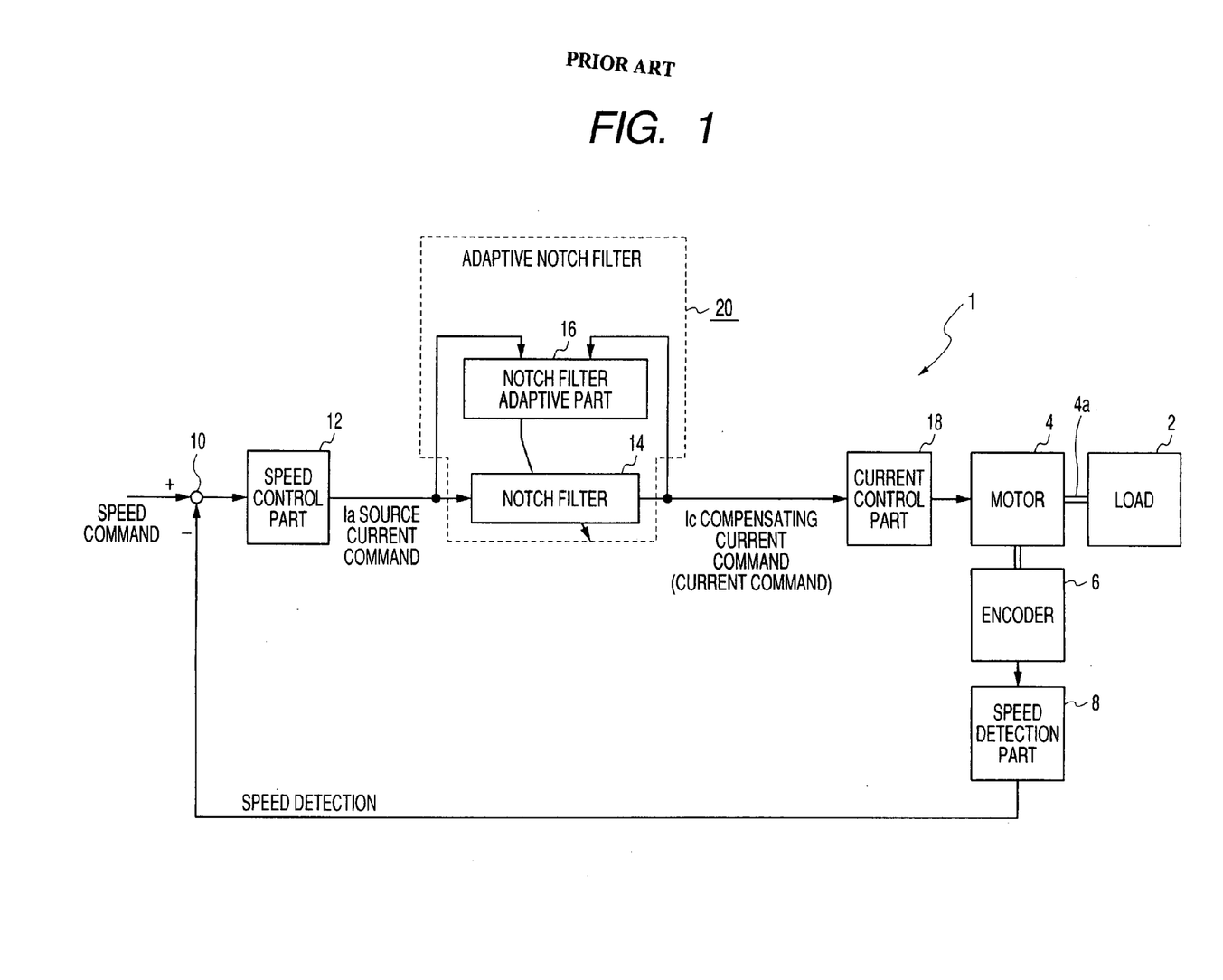
FIG. 1 is a block diagram of a speed control apparatus of a motor using a notch filter adaptive part.

Thus, as a simple and easy method for matching the notch frequency with the mechanical system resonance frequency, an adaptive notch filter is proposed. The adaptive notch filter is described in, for example, "Analysis of State Characteristics of Adaptive IIR Digital Notch Filter" (Paper Journal of Institute of Electronics, Information and Communication Engineers, Vol. J81-A, No. 9). A block diagram of a speed control apparatus of a motor using an adaptive notch filter is shown in FIG. 1. In FIG. 1, a speed control apparatus of a motor includes a motor 4 having a shaft 4a while driving a load 2, a speed detection part 8 for computing a speed detection signal of the motor 4 by detecting a rotational angle of the motor 4 by an encoder 6 to differentiate the rotational angle (position), a speed control part 12 for obtaining a speed error resulting in a difference between a speed command signal and the speed detection signal by a speed comparator 10 and multiplying the speed error by a speed gain Kv and outputting a source current command signal Ia, a notch filter 14 for generating a compensating current command signal Ic in which a notch frequency resulting in a particular frequency component of the source current command signal Ia is eliminated, a notch filter adaptive part 16 for adjusting a notch frequency so that a current command signal in which a sustained vibration frequency component is eliminated is generated from the notch filter 14, and a current control part 18 for generating a torque command signal of the motor 4 based on the compensating current command signal (current command signal) Ic.

Incidentally, an adaptive notch filter 20 includes the notch filter adaptive part 16 and the notch filter 14.

Contents of processing of the notch filter adaptive part 16 are described in the paper journal and basically, a notch frequency is adjusted so that an output of a ripple of the notch filter 14 decreases. When a control system becomes an oscillation state and the motor 4 and the load 2 vibrate at a resonance frequency, the vibration is detected by the encoder 6 and is inputted to the notch filter 14 through the speed detection part 8, the comparator 10 and the speed control part 12. When the notch frequency does not match with the resonance frequency of the control system, the notch filter 14 cannot suppress oscillation, so that mechanical resonance increases with time. As a result of that, a signal component of the resonance frequency is largely included in input of the notch filter 14 and becomes predominant. In the notch filter adaptive part 16, the signal component of the resonance frequency is largely included in the source current command signal Ia resulting in input of the notch filter 14, so that elimination of the frequency component leads to a decrease in output. As a result, the notch filter adaptive part 16 acts so as to approximate the notch frequency to the resonance frequency and finally, the notch frequency substantially matches with the resonance frequency.

Figure 2:
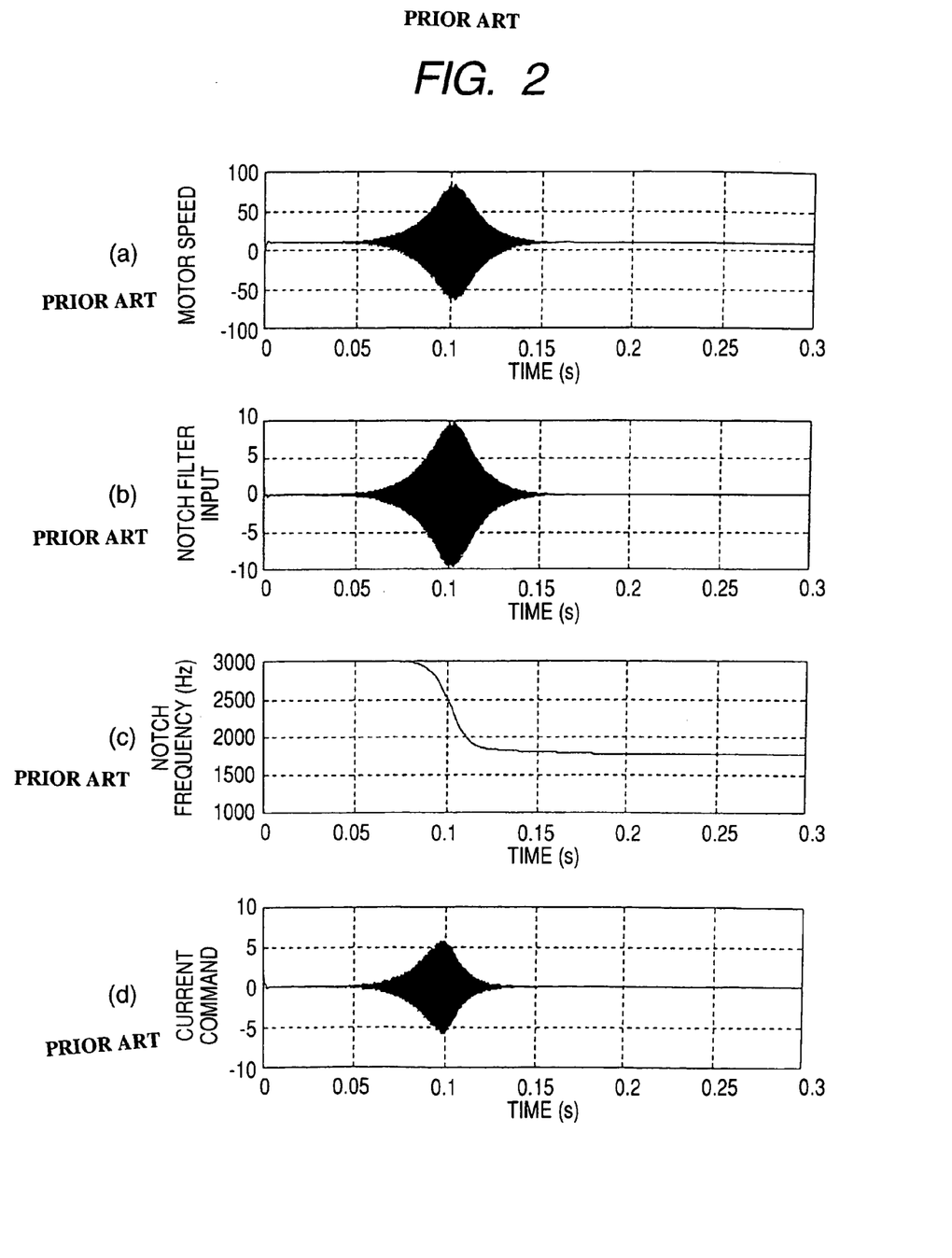
FIGS. 2(a) to 2(d) are time charts by simulation of the speed control apparatus of the motor shown in FIG. 1.
Figure 3:
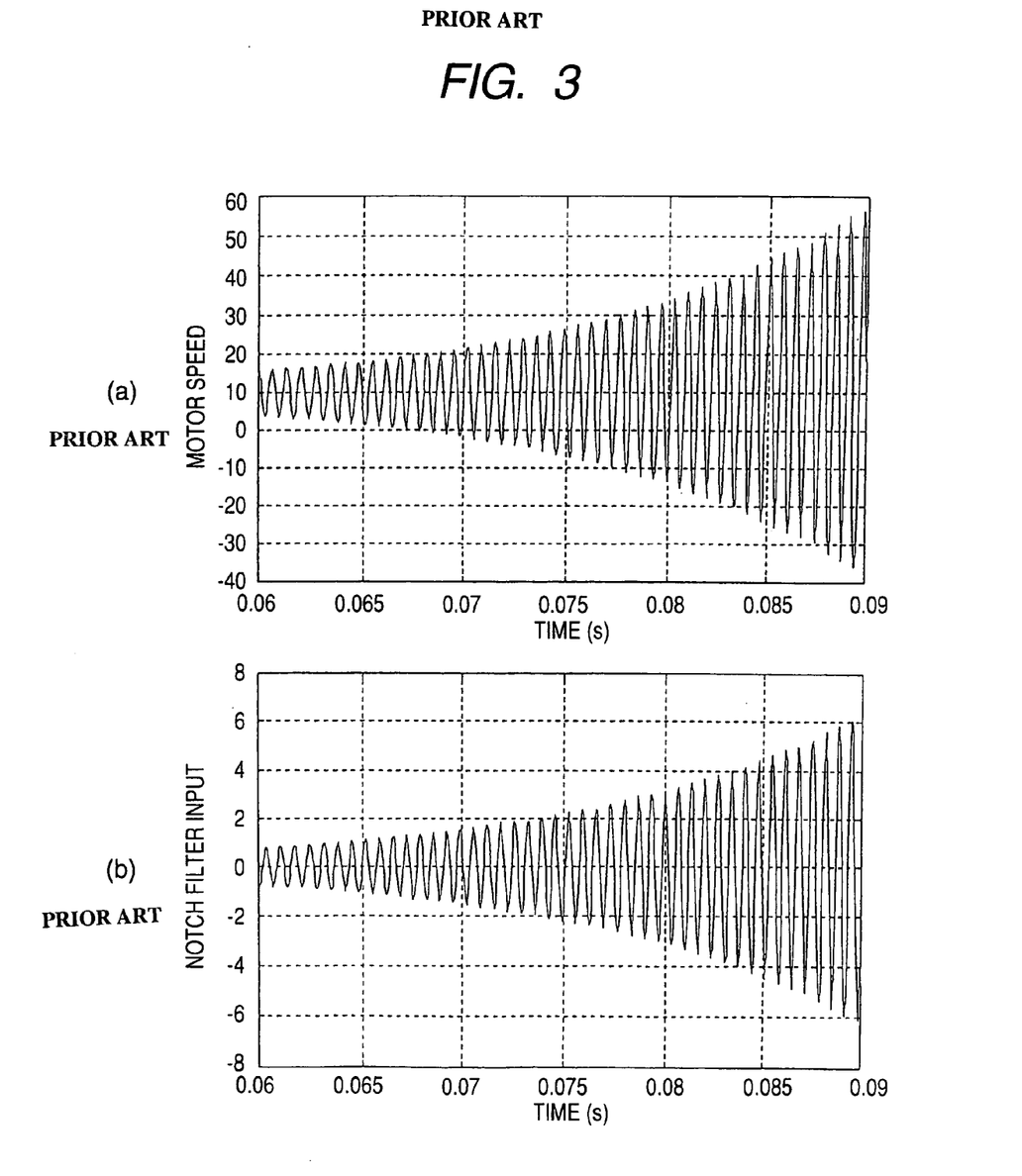
FIGS. 3(a) to 3(b) are time charts by simulation of the speed control apparatus of the motor shown in FIG. 1.
Figure 4:
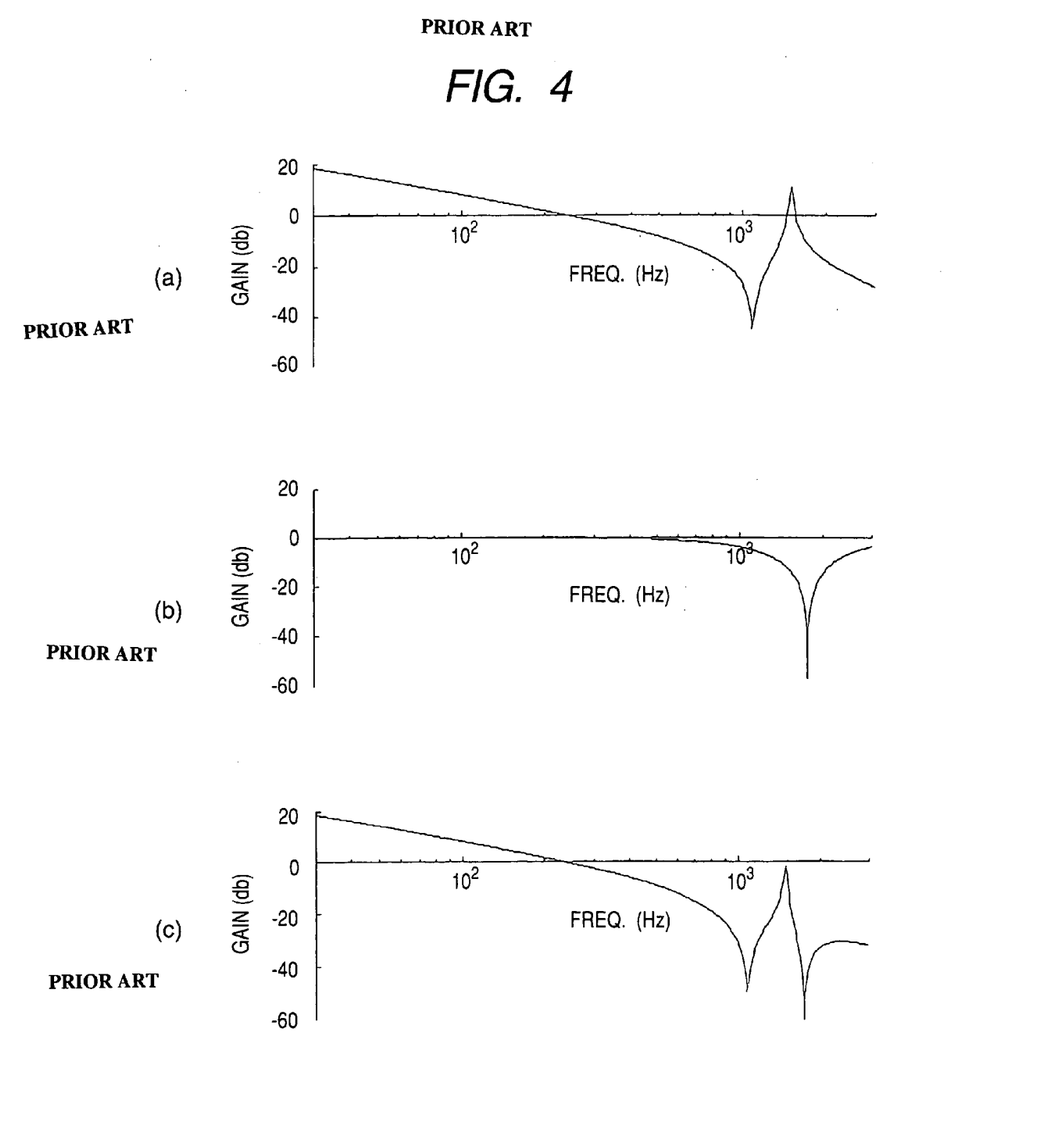
FIGS. 4(a) to 4(c) are gain diagram of a speed control system in the case of adjusting a notch frequency of the speed control apparatus of the motor shown in FIG. 1.

The fact that oscillation of the control system is suppressed by the adaptive notch filter 20 will be described by simulation shown in FIGS. 2 to 4. FIG. 2 is a time chart of the speed control apparatus of the motor shown in FIG. 1 and (a) is motor speeds detected by the speed detection part 8 and (b) is inputs of the notch filter 14 and (c) is changes in a notch frequency adjusted by the notch filter adaptive part and (d) is current commands which are outputs of the notch filter 914 and FIG. 3 is enlarged diagrams of FIGS. 2(a) and 2(b), and FIG. 4 is a gain diagram of a speed control system of the speed control apparatus shown in FIG. 1.

An open loop gain characteristic of a speed control system at the time when a notch filter is not inserted is shown in FIG. 4(a), and a resonance frequency is 1500 Hz and the resonance peak is larger than 0 decibel, so that this state indicates that a control system oscillates.

Therefore, in an initial state, a notch frequency is set to 3000 Hz and using 3000 Hz as an initial value, the notch filter adaptive part 16 adjusts the notch frequency. Control is started from the time 0 and first, a resonance frequency does not match with a notch frequency, so that a control system becomes an oscillation state and a motor speed (speed detection signal) vibrates and the amplitude increases with time. In FIG. 2(a), the motor speed is blacked out and this is because a frequency of the vibration is high. In the case of being enlarged in a time axis direction, vibration occurs at a resonance frequency of 1500 Hz as shown in FIG. 3(a). A speed detection signal from the speed detection part 8 is inputted to the notch filter 14 through the speed comparator 10 and the speed control part 12. A source current command signal Ia inputted to the notch filter 14 is expressed as shown in FIG. 2(b) in the case of enlarging this in a time axis direction, the source current command signal is a vibration component of 1500 Hz as shown in FIG. 3(b). As vibration of 1500 Hz increases, the notch filter adaptive part 16 adjusts the notch frequency so as to eliminate the frequency component and as shown in FIG. 2(c), the notch frequency approximates to 1500 Hz of the resonance frequency with time. When the notch frequency approximates to the resonance frequency at the time (0.1 second), oscillation of the control system proceeds to convergence and the oscillation state is eliminated at the time (0.17 second). Thus, in the adaptive notch filter 20, the notch frequency automatically changes and oscillation is suppressed when the control system starts to oscillate.

However, in the case of well observing FIG. 2(c), it is found that the notch frequency after adjustment is 1770 Hz and does not match with the resonance frequency of 1500 Hz. This is because oscillation converges as adjustment of the notch frequency proceeds and the notch frequency approximates to the resonance frequency to a certain extent.

As described above, in the case that adjustment of the notch frequency functions effectively, a signal component of the resonance frequency must continue to be inputted to the notch filter 14. However, when oscillation of the control system converges, vibration of the motor 4 also stops and the signal component of the resonance frequency is not included in a speed detection signal from the speed detection part 8. As a result of this, the signal component of the resonance frequency is not included in a source current command signal Ia resulting in input of the notch filter 14 and adjustment of the notch frequency by the notch filter adaptive part 16, that is, an adaptive operation does not proceed further. Finally, a notch frequency of 1770 Hz is obtained and a gain characteristic of the notch filter 14 at 1770 Hz is shown in FIG. 4(b) and a gain characteristic of a speed control system including the notch filter 14 is shown in FIG. 4(c).

As shown in FIG. 4(c), though an oscillation state is not reached since the resonance peak does not exceed 0 decibel, it is found that it is near to the limit at which oscillation occurs since the resonance peak is near to 0 decibel. As a result of this, there was a problem that the control system may again run into an oscillation state even when a characteristic of a mechanical system such as the load 2 only changes slightly due to a change with time etc.

DISCLOSURE OF THE INVENTION

The invention is implemented to solve the problem, and an object of the invention is to provide a speed control apparatus of a motor capable of accurately adjusting a notch frequency in a notch filter.

A speed control apparatus of a motor according to the invention is characterized by including a motor for driving a load, current command generation unit which generates a source current command signal capable of having a frequency component based on a difference between a speed command signal of the motor and a speed detection signal in which a speed of the motor is detected, notch filter unit which can break a notch frequency resulting in a predetermined frequency selected among continuous frequency band widths and also generates a compensating current command signal in which the notch frequency is eliminated from the source current command signal inputted, notch filter adjustment unit which selects the notch frequency so that the compensating current command signal in which a sustained vibration frequency component of the source current command signal is eliminated is generated from the notch filter unit, subtraction unit which generates an elimination portion current command signal resulting in a difference between the source current command signal and the compensating current command signal, addition unit which adds the compensating current command signal and the elimination portion current command signal and generating a current command signal passed through the motor, and current limit unit which limits a maximum value of the current command signal.

According to such a speed control apparatus of the motor, subtraction unit generates an elimination portion current command signal resulting in a difference between a source current command signal and a compensating current command signal, and addition unit adds the compensating current command signal and the elimination portion current command signal and generates a current command signal, and current limit unit limits a maximum value of the current command signal.

Therefore, the elimination portion current command signal is generated (produced) based on the source current command signal and the current command signal is produced by the elimination portion current command signal and the compensating current command signal, so that even if the compensating current command signal does not vibrate, the current command signal vibrates and a speed detection signal of the motor also vibrates and thereby the source current command signal also vibrates. Thus, vibration of the current command signal can be sustained, so that there is an effect of facilitating selection (adjustment) of a notch frequency of notch filter unit.

A speed control apparatus of a motor according to another invention is characterized by including limiter unit which inputs the elimination portion current command signal and generating a limit current signal while limiting a maximum value of the elimination portion current command signal instead of the current limit unit.

According to such a speed control apparatus of the motor, limiter unit can limit vibration of the elimination portion current command signal within a desired predetermined value, so that there is an effect capable of adjusting a notch frequency of a notch filter while suppressing vibration of the motor.

Notch filter adjustment unit in a speed control apparatus of a motor according to another invention is characterized by automatically adjusting the notch frequency so as to match with a sustained vibration frequency component of the source current command signal.

According to such a speed control apparatus of the motor, there is an effect capable of easily adjusting a notch frequency of a notch filter.

A speed control apparatus of a motor according to another invention is characterized by including oscillation decision unit which decides whether or not the compensating current command signal has oscillated and also generating a decision signal, and switch unit which turns on and off the limit current signal based on the decision signal and inputting the limit current signal to the addition unit.

According to such a speed control apparatus of the motor, oscillation decision unit decides that adjustment to a notch frequency is completed by a stop of oscillation and the limit current signal is turned off, so that there is an effect that the compensating current command signal results in a current command signal and vibration of the current command signal is not sustained.

BEST MODE FOR CARRYING OUT THE INVENTION

Figure 5:
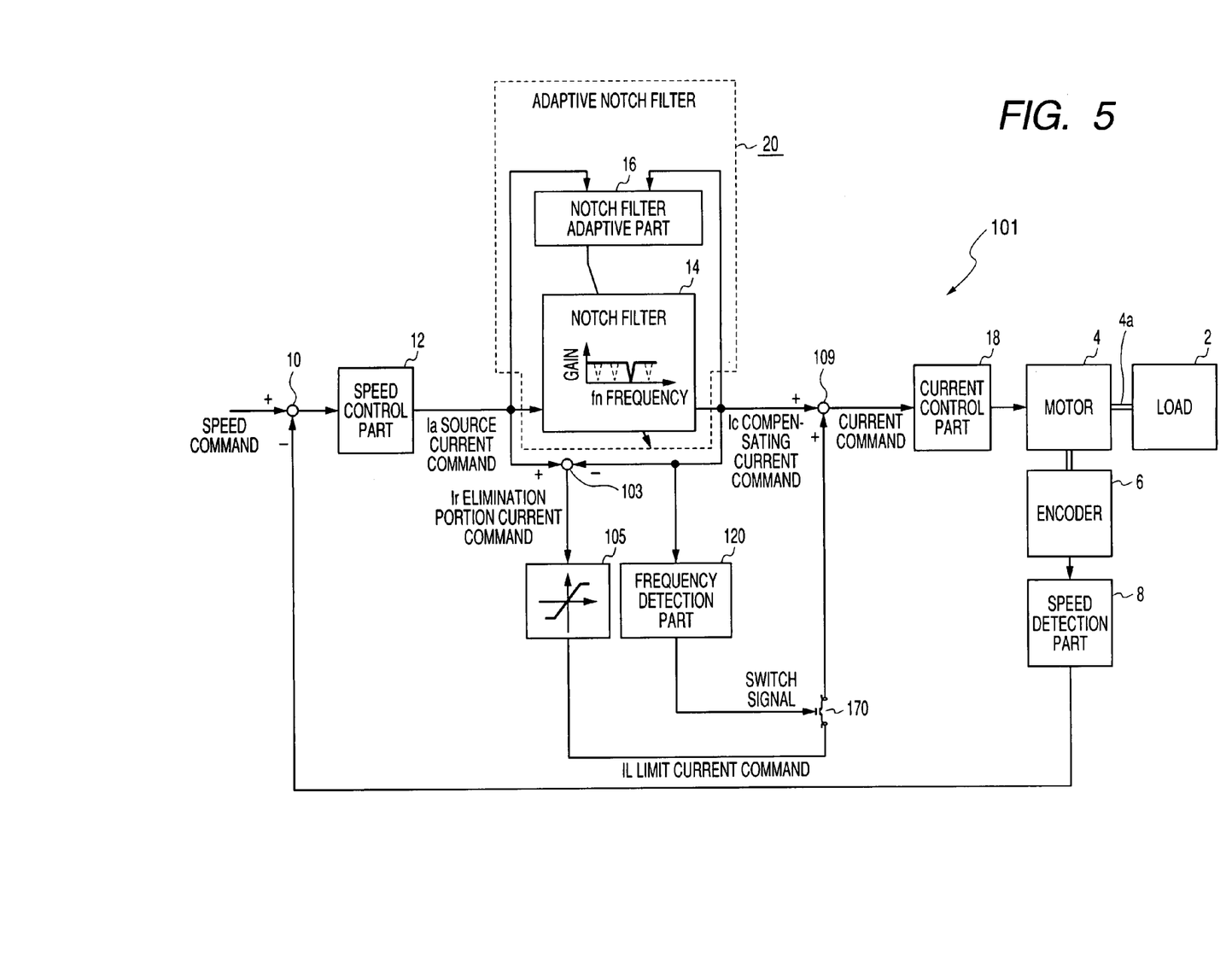
FIG. 5 is a block diagram of a speed control apparatus of a motor showing one embodiment of the invention.

A speed control apparatus of a motor according to one embodiment of the invention will be described by FIGS. 5 and 6. FIG. 5 is a block diagram of a speed control apparatus of a motor according to one embodiment, and FIG. 6 is a block diagram of a vibration detection part shown in FIG. 5.

Figure 6:
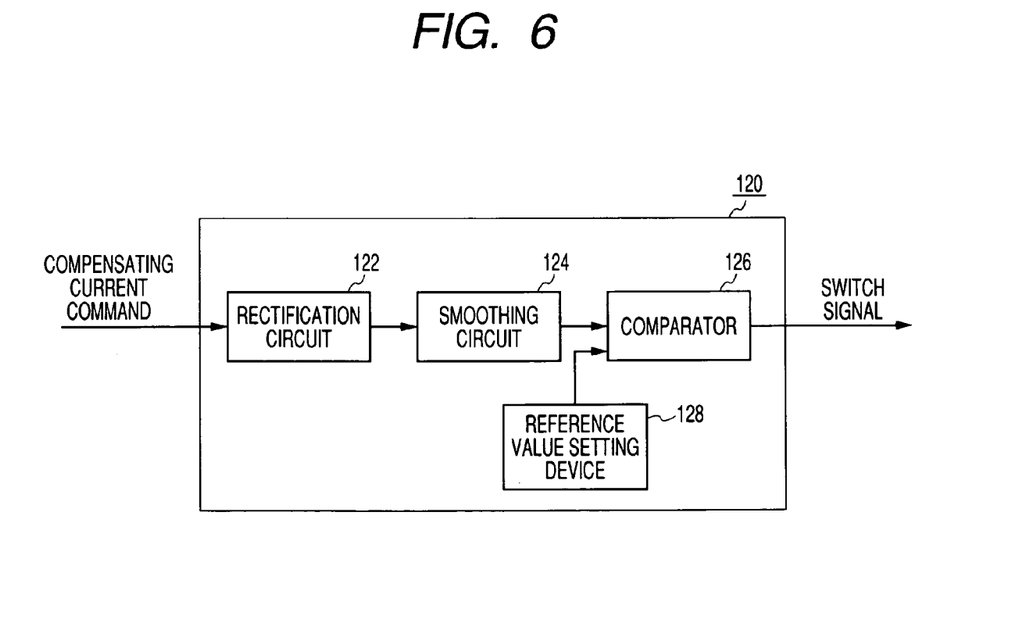
FIG. 6 is a block diagram showing a vibration detection part shown in FIG. 5.

In FIGS. 5 and 6, a speed control apparatus 101 of a motor includes a motor 4 which drives a load 2 and whose shaft 4a is connected to the load 2, an encoder 6 for detecting a detection position (detection rotational angle) of the motor 4, a speed detection part 8 for computing a detection speed signal of the motor 4 by differentiating the detection position, a speed comparator 10 for obtaining a difference between the detection speed signal and a speed command signal given from a host controller (not shown) and outputting a speed error, a speed control part 12 acting as current command generation unit which multiplies a speed gain Kv by the speed error and outputting a source current command signal Ia, a notch filter 14 acting as notch filter unit which inputs the source current command signal Ia and also has continuous frequency band widths and selects a notch frequency fn resulting in an arbitrary particular predetermined frequency in the frequency band widths and generates a compensating current command signal Ic in which a sustained vibration frequency component is eliminated from the source current command signal Ia and, for example, selects a notch frequency fn resulting in a particular frequency component (for example, 3000 Hz, 1500 Hz, . . . ) among frequency bands of 5000 Hz to 100 Hz, a notch filter adaptive part 16 acting as notch filter adjustment unit which selects (adjusts) the notch frequency fn, for example, automatically so that the compensating current command signal Ic in which the sustained vibration frequency component of the source current command signal Ia is eliminated is generated from the notch filter 14, that is, a ripple of the compensating current command signal Ic decreases by making selections (adjustments) every moment, for example, 3000 Hz, 1500 Hz, . . . , etc., and a current control part 18 for generating a torque command signal of the motor 4 based on the compensating current command signal Ic.

A sustained vibration maintenance part includes a subtracter 103 acting as subtraction unit which subtracts the compensating current command signal Ic from the source current command signal Ia and outputting an elimination portion current command signal Ir, a limiter 105 acting as limiter unit which inputs the elimination portion current command signal Ir and outputs a limit current command signal IL suppressed to a predetermined value or less, a vibration detection part 120 acting as oscillation decision unit in which it is decided whether or not the compensating current command signal Ic has vibrated (oscillated) and when it is decided that it has vibrated, an on signal is generated and when it is decided that it has not vibrated, an off signal is generated, an on-off part 107 acting as switch unit which switches on (closes) by the on signal of the vibration detection part 120 and switches off (opens) by the off signal, and an adder 109 acting as addition unit which adds the compensating current command signal Ic and the limit current command signal IL.

Here, the predetermined value of the limiter 105 is preferably a value in which a speed control system of the motor 4 maintains sustained vibration based on the elimination portion current command signal Ir and is the smallest possible value. This is because it is constructed so as not to cause excessive vibration to the motor 4 etc. while adjusting the notch frequency fn of the notch filter 14 by the sustained vibration. For example, the value is set to about several percent of rated current of the motor 4.

The vibration detection part 120, which decides whether or not the compensating current command signal Ic has vibrated, includes a rectification circuit 122 for rectifying the compensating current command signal Ic, a smoothing circuit 124 for smoothing an input signal after rectification by the rectification circuit 122, and a comparator 126 in which a smoothing value from the smoothing circuit 124 is compared with a reference value set by a reference value setting device 128 and thereby when the smoothing value is larger than the reference value, it is decided that the compensating current command signal Ic has vibrated and an on signal is generated and when smoothing value is smaller than the reference value, it is decided that the compensating current command signal Ic has not vibrated and an off signal is generated. Incidentally, both of the on signal and the off signal are called a switch signal.

Figure 7:
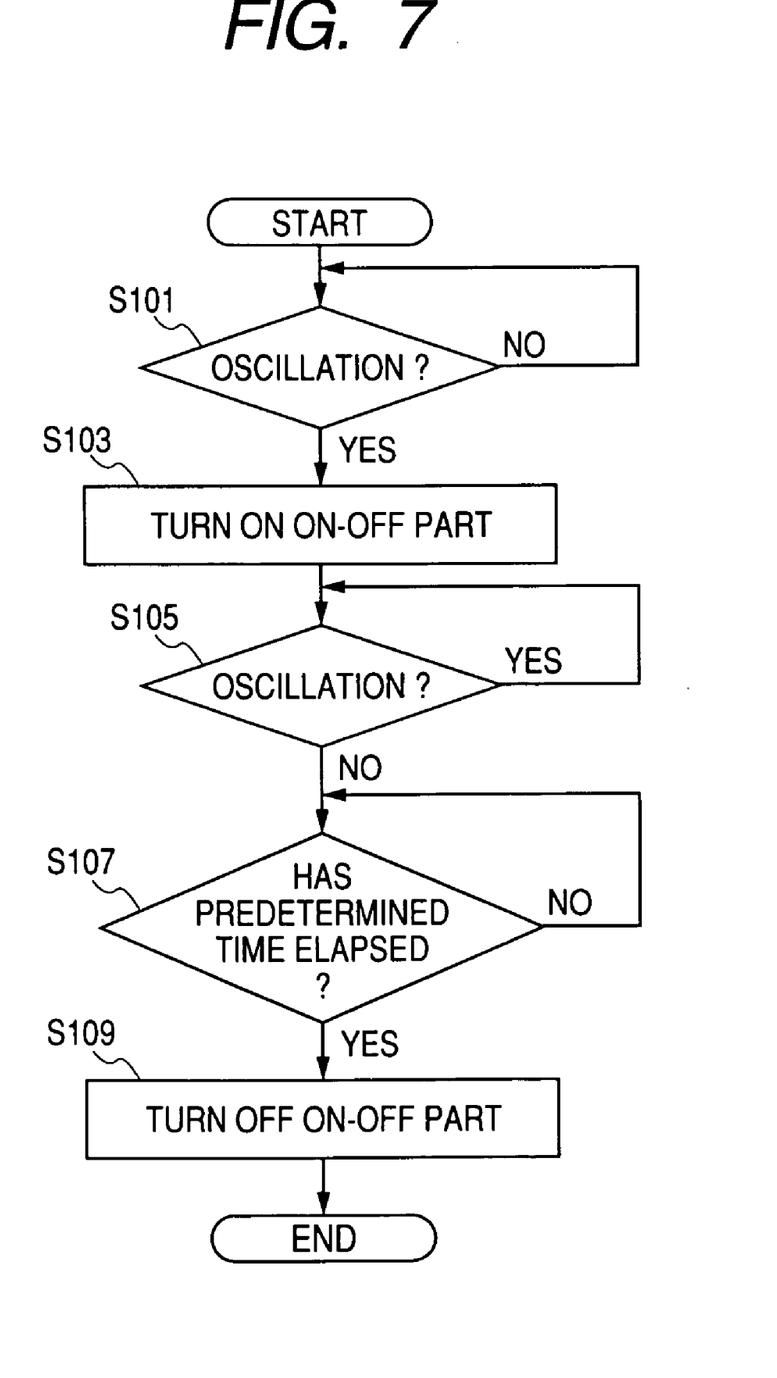
FIG. 7 is a flowchart showing an operation of an on-off part shown in FIG. 5.

Action of the speed control apparatus 101 constructed as described above will be described by FIGS. 5 to 7. FIG. 7 is a flowchart showing an operation of the on-off part shown in FIG. 5. Now, when it is assumed that speed control is performed while the motor 4 drives the load 2 based on a speed command signal from a host controller (not shown), a position detection signal (rotational angle) of the motor 4 is detected by the encoder 6 and a speed detection signal is inputted to the speed comparator 10 through the speed detection part 8. The comparator 10 obtains a difference (speed error) between a speed command signal and the speed detection signal and inputs the difference to the speed control part 12.

The speed control part 12 generates a source current command signal Ia and inputs the source current command signal Ia to the notch filter 14 and the notch filter adaptive part 16, and a compensating current command signal Ic is inputted from the notch filter 14 to the notch filter adaptive part 16. The notch filter adaptive part 16 generates a compensating current command signal Ic in which a notch frequency fn is automatically selected (adjusted) from continuous frequency band widths in the notch filter 14 so as to decrease a sustained vibration component of the compensating current command signal Ic.

The subtracter 103 obtains an elimination portion current command signal Ir resulting in a difference between the source current command signal Ia and the compensating current command signal Ic, and the elimination portion current command signal Ir is inputted to the limiter 105, and the limiter 105 outputs a limit current command signal IL.

The vibration detection part 120 decides whether or not the compensating current command signal Ic has oscillated (vibrated) as described above (step S101), and when it has vibrated, an on signal is generated and the on-off part 107 is turned on (step S103), and the adder 109 inputs a current command signal in which the limit current command signal IL and the compensating current command signal Ic are added to the current control part 18. The current control part 18 gives a torque command signal to the motor 4 and drives the motor 4 along with the load 2.

Next, the vibration detection part 120 decides whether or not the compensating current command signal Ic has vibrated (step S105), and when the vibration converges, it waits until predetermined time has elapsed (step S107), and an off signal is generated and the on-off part 107 is turned off (step S109). As a result of this, addition of the limit current command signal IL to the adder 109 is stopped and only the compensating current command signal Ic is inputted from the adder 109 to the current control part 18 as a current command signal and the motor 4 is driven.

That is, in the speed control apparatus 101 according to the present embodiment, the elimination portion current command Ir is changed to the limit current command IL through the limiter 105 and is added to the compensating current command signal Ic and a current command signal is obtained and thereby vibration is sustained. Therefore, even when the compensating current command signal Ic is not vibratory, the source current command signal Ia based on a difference between the speed command signal and the speed detection signal also vibrates. Since the source current command signal Ia vibrates, room to adjust the notch frequency fn of the notch filter 14 arises, so that adjustment accuracy of the notch frequency fn can be improved.

Figure 8:
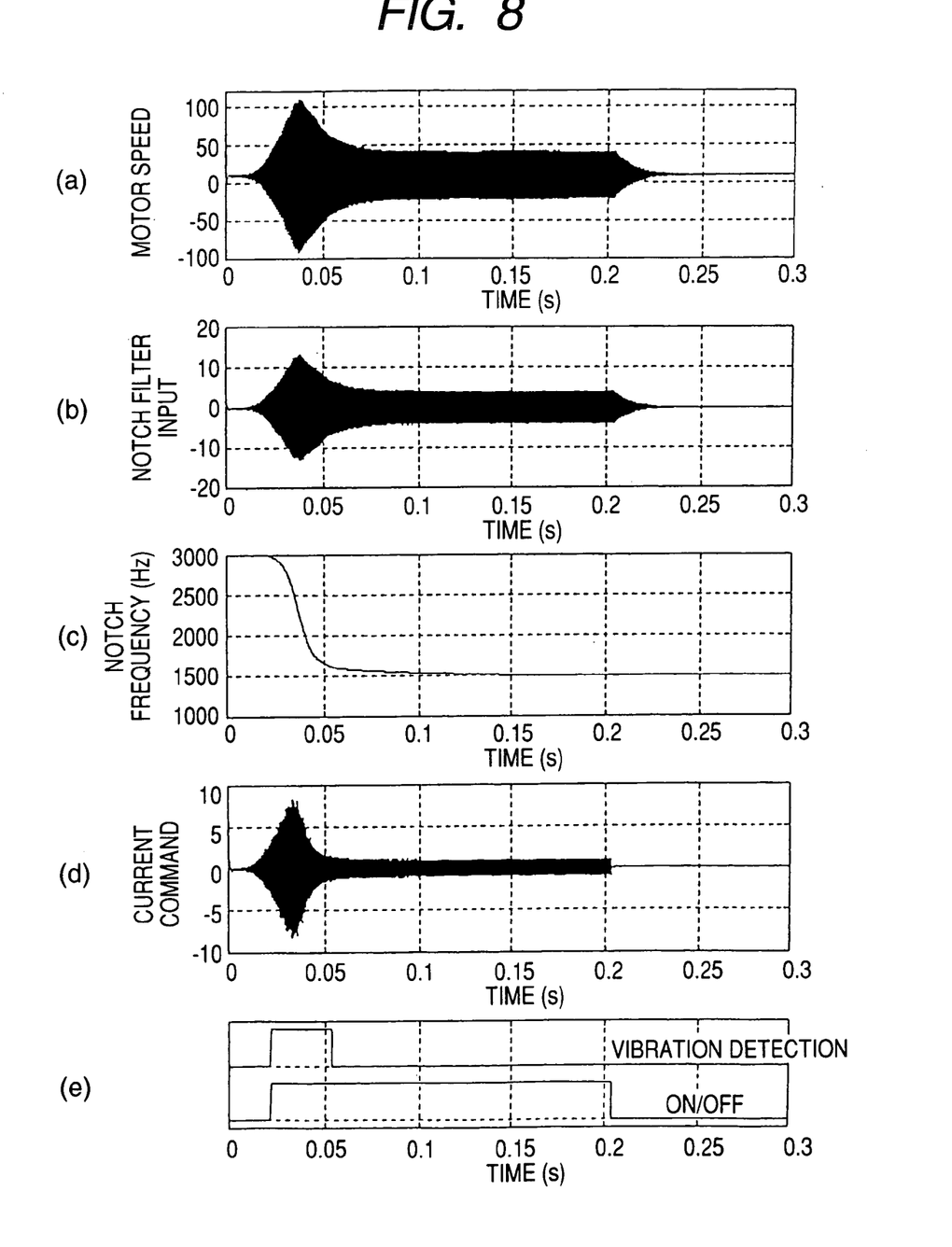
FIGS. 8(a) to 8(e) are time charts by simulation of each part in the speed control apparatus of the motor shown in FIG. 5.

Next, action of the speed control apparatus 101 of the motor will be described on the basis of a simulation result shown in FIG. 8. FIG. 8 is a diagram simulated on the same condition as that of FIG. 2, and FIGS. 8(a) to 8(d) correspond to FIGS. 2(a) to 2(d), and (a) shows speeds of the motor 4 and (b) shows inputs (source current command signals Ia) of the notch filter 14 and (c) shows a notch frequency fn and (d) shows current commands and (e) shows a state of the on-off part 107 and outputs (switch signals) of the vibration detection part 120.

When control of the speed control apparatus 101 is started from the time 0, a control system starts to oscillate. With this, the notch filter adaptive part 16 adjusts a notch frequency fn of the notch filter 14 (FIG. 8(c)), and the notch frequency fn approximates to a resonance frequency. As a result of this, in detection speeds and current commands of the motor 4, vibration starts to converge from the time (0.04 second) (FIGS. 8(a) and 8(d)).

When the vibration detection part 120 detects vibration at the time (0.02 second), the on-off part 107 is turned on (FIG. 8(e)), and the adder 109 starts to add a limit current signal IL and a compensating current command signal Ic. As a result of this, oscillation of a current command signal does not converge completely and as shown in FIG. 8(a), vibration is sustained at a constant level until the time (0.2 second) Setting is made so as to turn off the on-off part 107 after 0.15 second since a lapse of 0.05 second at which vibration converges at the constant level, so that as shown in FIG. 8(e), the on-off part 107 is turned off at the time (0.2 second) and addition of the limit current command signal IL to the adder 109 is stopped and subsequent to that, vibration converges.

According to the present embodiment, the elimination portion current command signal Ir passes through the limiter 105 and the limit current command signal IL is added to the compensating current command signal Ic and thereby the current command signal can be made to sustain vibration at a constant level. While the vibration is sustained, a vibration component of a resonance frequency continues to be inputted to the notch filter 14 as shown in FIG. 8(b). Therefore, while the notch frequency fn is adjusted accurately, a value of the elimination portion current command signal Ir is limited by the limiter 105, so that vibration caused from the motor 4 can be suppressed.

Figure 9:
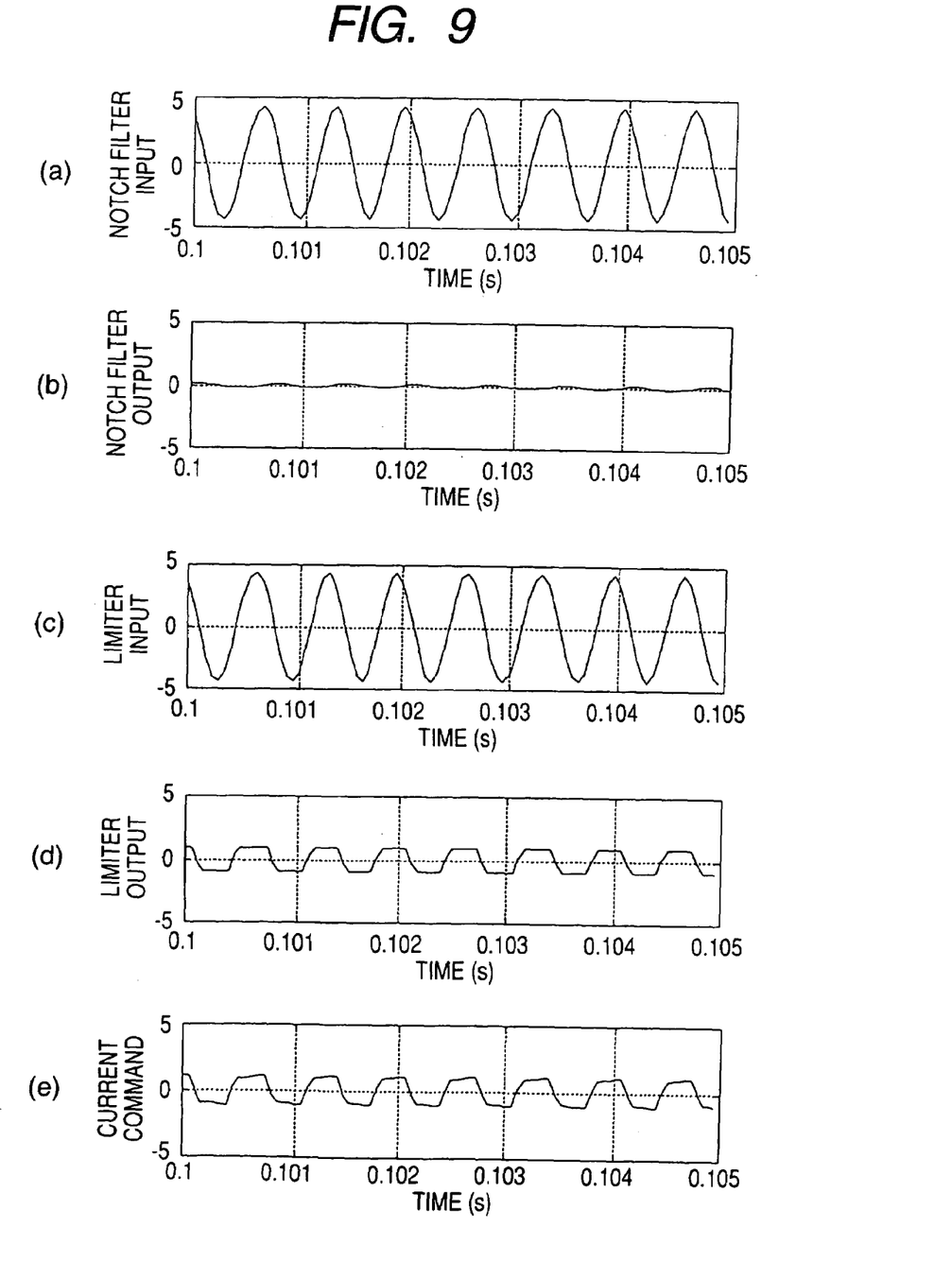
FIGS. 9(a) to 9(e) are time charts by simulation describing action of a limiter shown in FIG. 5.

Further, action of the limiter 105 of the speed control apparatus 101 will be described in detail by FIG. 9. FIG. 9 shows input and output of the notch filter 14, input and output of the limiter 105 and current commands in the range from the time (0.1 second) to the time (0.105 second) in the simulation result of FIG. 8. Vibration of the motor 4 detected by the speed detection part 8 is fed back to the comparator 10 and is inputted to the notch filter 14 through the speed control part 12. A source current command signal Ia inputted to the notch filter 14 is shown in FIG. 9(a), and is a vibration component of 1500 Hz which is a resonance frequency fc. As shown in FIG. 8(c), at the time (0.1 second), a notch frequency fn substantially matches with the resonance frequency fc, so that most of the vibration components of the source current command signal Ia are eliminated by the notch filter 14 and the output is expressed as shown in FIG. 4(b). In the subtracter 103, a signal component eliminated by the notch filter 14 is calculated and outputted by subtracting a compensating current command signal Ic from the source current command signal Ia. This results in the vibration component of 1500 Hz as shown in FIG. 9(c) and is inputted to the limiter 105. Tn the limiter 105, amplitude of the vibration component of 1500 Hz inputted is limited by a predetermined value and the vibration component is outputted. Limit values herein are ±1 and the output is expressed as shown in FIG. 9(d). This is added to output (FIG. 9(b)) of the notch filter 14 by the adder 109 and a current command as shown in FIG. 9(e) is obtained.

Since the output (FIG. 9(d)) of the limiter 105 is added to the current command, a signal component for vibrating the motor 4 at a frequency of 1500 Hz is included in the current command as shown in FIG. 9(e). Since the motor 4 is driven by this, vibration of the motor 4 does not converge completely and the vibration is continued. The vibration is detected by the speed detection part 8 and is again inputted to the notch filter 14. In this manner, the vibration component of the resonance frequency fc of 1500 Hz is continuously inputted to the notch filter 14 and as a result of this, the notch frequency fn can be adjusted accurately.

Also, amplitude of output of the limiter 105 is limited by a limit value, so that amplitude of vibration of the motor 4 does not increase excessively and is suppressed at a constant level. When the limit value is set to a small value, the amplitude of vibration of the motor 4 also decreases and application of an excessive load to the motor 4 or a machine is eliminated.

Figure 10:
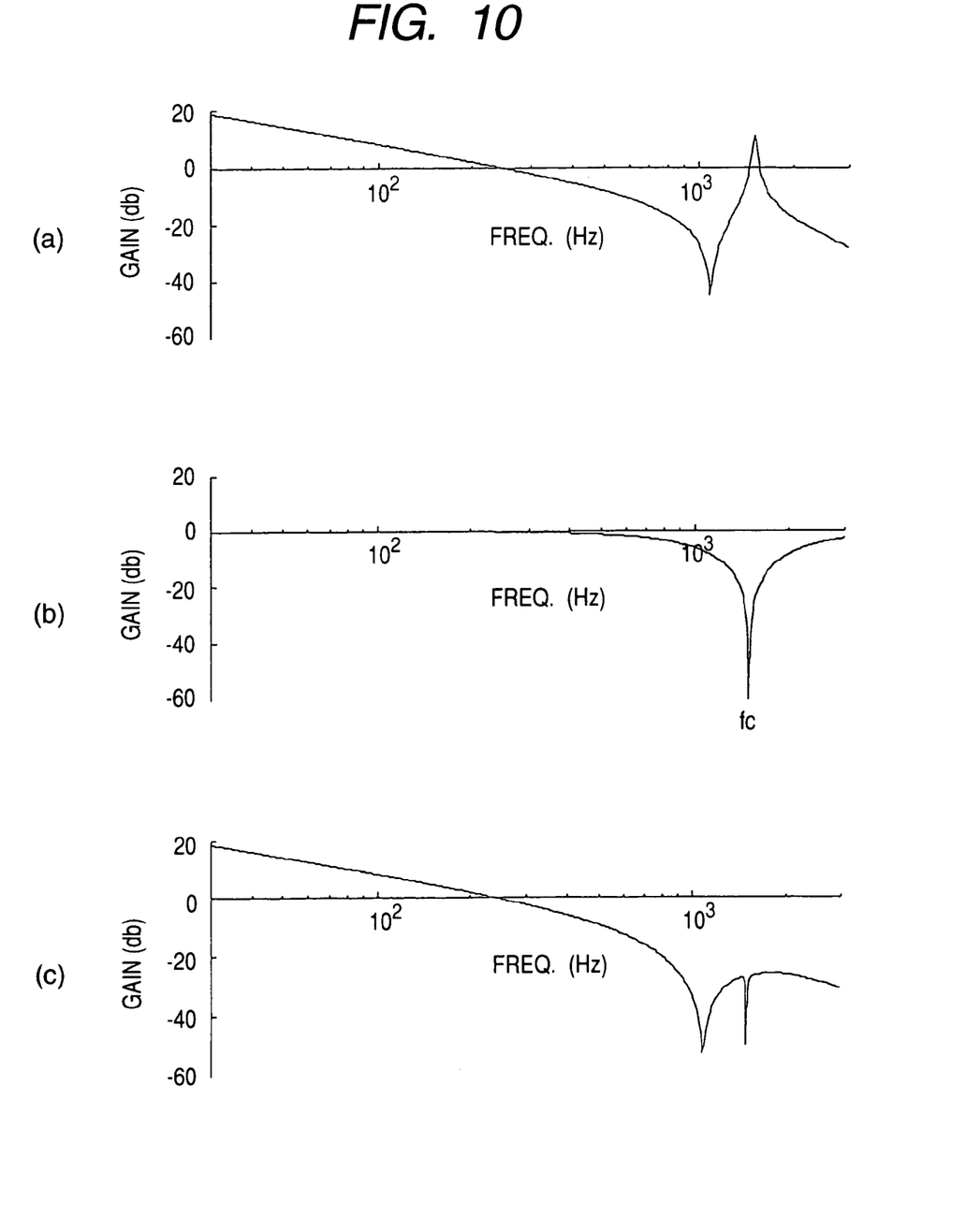
FIGS. 10(a) to 10(c) are gain diagrams of a speed control system in the case of adjusting a notch frequency of the speed control apparatus shown in FIG. 5.

The final notch frequency fn is 1500 Hz as shown in FIG. 8(c) and exactly matches with the resonance frequency. A gain characteristic of the notch filter 14 in this case is expressed as shown in FIG. 10(*b*). An open loop gain characteristic of the original speed control system is FIG. 10(*a*), and an open loop gain characteristic in which both of the characteristics are combined is expressed as shown in FIG. 10(*c*). Since the notch frequency fn matches with the resonance frequency fc, the resonance peak is cut.

Here, it has been constructed so as to turn off the on-off part 107 after a lapse of predetermined time since vibration of the compensating current command signal Ic converged, but similar effect can also be obtained in the case of being constructed so as to turn off the on-off part 107 at the completion of adjusting the notch frequency fn. For that purpose, it could be constructed so that a change in the notch frequency fn adjusted by the notch filter adaptive part 16 is monitored and when the notch frequency fn does not change for predetermined time, it is considered that adjustment to the notch frequency fn is completed and the on-off part 107 is turned off.

Incidentally, in the speed control apparatus of the present embodiment, the limiter 105 has been provided, but the limiter 105 is not necessarily provided as long as there is a function of limiting a current command in the current control part 18 etc.

INDUSTRIAL APPLICABILITY

As described above, a speed control apparatus of a motor according to the invention is suitable to adjust a notch filter.

The invention claimed is:

1. A speed control apparatus of a motor comprising:
   a motor for driving a load,
   a current command generation unit which generates a source current command signal having a frequency component based on a difference between a speed command signal of the motor and a speed detection signal in which a speed of the motor is detected,
   a notch filter unit that both blocks a notch frequency having a predetermined frequency selected among continuous frequency band widths, and generates a compensating current command signal in which the notch frequency is eliminated from the source current command signal inputted,
   a notch filter adjustment unit which selects the notch frequency so that the compensating current command signal, in which a sustained vibration frequency component of the source current command signal is eliminated, is generated from the notch filter unit,
   a subtraction unit which generates an elimination portion current command signal resulting in a difference between the source current command signal and the compensating current command signal,
   an addition unit which adds the compensating current command signal and the elimination portion current command signal and generates a current command signal passed through the motor, and
   a current limit unit which limits a maximum value of the current command signal.

2. The speed control apparatus of a motor as claimed in claim 1, wherein a limiter unit inputs the elimination portion current command signal and generates a limit current signal while limiting a maximum value of the elimination portion current command signal.

3. The speed control apparatus of a motor as claimed in claim 1 or 2, wherein the notch filter adjustment unit automatically adjusts the notch frequency to match with the sustained vibration frequency component of the source current command signal.

4. The speed control apparatus of a motor as claimed in claim 3, further comprising an oscillation decision unit which decides whether or not the compensation current command signal has oscillated and also generates a decision signal, and a switch unit which turns on and off the limit current signal based on the decision signal and inputs the limit current signal to the addition unit.

\* \* \* \* \*